United States Patent
Dvorak et al.

(10) Patent No.: US 7,475,022 B1
(45) Date of Patent: Jan. 6, 2009

(54) METHOD AND APPARATUS FOR HANDLING DISRUPTIVE EVENTS AND REPLACEMENT ITEMS

(75) Inventors: Robert E. Dvorak, Atherton, CA (US); Beth Li-Ju Chen, Port Jefferson, NY (US)

(73) Assignee: Bluefire Systems, Inc., Boca Raton, FL (US)

( * ) Notice: Subject to any disclaimer, the term of this patent is extended or adjusted under 35 U.S.C. 154(b) by 727 days.

(21) Appl. No.: 09/905,174

(22) Filed: Jul. 13, 2001

Related U.S. Application Data

(63) Continuation-in-part of application No. 09/766,539, filed on Jan. 19, 2001, and a continuation-in-part of application No. 09/760,377, filed on Jan. 12, 2001, and a continuation-in-part of application No. 09/755,355, filed on Jan. 5, 2001, and a continuation-in-part of application No. 09/755,635, filed on Jan. 5, 2001, and a continuation-in-part of application No. 09/708,944, filed on Nov. 8, 2000.

(51) Int. Cl.
*G06F 17/30* (2006.01)
(52) U.S. Cl. ..................... 705/10
(58) Field of Classification Search .............. 705/10
See application file for complete search history.

(56) References Cited

U.S. PATENT DOCUMENTS

| | | | |
|---|---|---|---|
| 5,168,445 A | 12/1992 | Kawashima et al. | |
| 5,237,496 A | 8/1993 | Kagami et al. | |
| 5,459,656 A * | 10/1995 | Fields et al. | 705/7 |
| 5,521,813 A * | 5/1996 | Fox et al. | 705/8 |
| 5,596,493 A * | 1/1997 | Tone et al. | 705/10 |
| 5,712,985 A | 1/1998 | Lee et al. | |
| 5,953,707 A | 9/1999 | Huang et al. | |
| 5,966,695 A | 10/1999 | Melchione et al. | |
| 6,151,582 A | 11/2000 | Huang et al. | |
| 6,341,269 B1 | 1/2002 | Dulaney et al. | |
| 6,434,544 B1 | 8/2002 | Bakalash et al. | |
| 6,493,678 B1 | 12/2002 | Foster et al. | |
| 6,510,420 B1 | 1/2003 | Cessna et al. | |
| 6,609,101 B1 * | 8/2003 | Landvater | 705/10 |
| 6,611,726 B1 * | 8/2003 | Crosswhite | 700/99 |
| 6,684,193 B1 * | 1/2004 | Chavez et al. | 705/8 |
| 6,928,398 B1 * | 8/2005 | Fang et al. | 703/2 |

(Continued)

OTHER PUBLICATIONS

Ghosh, Avijit, et al., "Formulating Retail Location Strategy in a Changing Environment", Journal of Marketing, 1983, pp. 56-68.*

(Continued)

*Primary Examiner*—Romain Jeanty
(74) *Attorney, Agent, or Firm*—Ernest J. Beffel, Jr.; Haynes Beffel & Wolfeld LLP

(57) ABSTRACT

Methods, systems and a machine readable memory are disclosed for adjusting projected demand items on an item-location basis. One environment in which the disclosed technology is useful is retail sales by companies with many items and numerous sales locations. Disruptive events and impact estimates can be calendared and applied to adjust both sales history quantities, which are used to project future demand, and to adjust future projected demand, directly. Impact estimates can be positive or negative, multiplicative or additive. Multiple disruptive events can be handled.

25 Claims, 3 Drawing Sheets

| 101 → Date | 3/4/2001 | 3/5/2001 | 3/6/2001 | 3/7/2001 | 3/8/2001 | 3/9/2001 | 3/10/2001 | 3/11/2001 | 3/12/2001 | 3/13/2001 | 3/14/2001 | 3/15/2001 | 3/16/2001 | 3/17/2001 | 3/18/2001 | 3/19/2001 | 3/20/2001 |
|---|---|---|---|---|---|---|---|---|---|---|---|---|---|---|---|---|---|
| 105 → Actual unit sales | 10 | 10 | 10 | 10 | 10 | | | | | | | | | | | | |
| 110 → Projected unit sales | | | | | | 10 | 10 | 10 | 8 | 8 | 8 | 8 | 8 | 8 | 8 | 8 | 8 |
| 115 → Cannibalization date | | | | | | | | | yes | | | | | | | | |
| 120 → Cannibalization factor | | | | | | | | | -0.2 | | | | | | | | |

↑
130

U.S. PATENT DOCUMENTS

2002/0116348 A1* 8/2002 Phillips et al. .............. 705/400
2002/0169657 A1* 11/2002 Singh et al. .................. 705/10
2003/0195791 A1* 10/2003 Waller et al. ................. 705/10

OTHER PUBLICATIONS

Hauge et al., "*How Low Can You Go? Using Simulation to Determine Appropriate Inventory Levels*", attributed to IIE Lean Management Solutions, Sep. 23-24, 2002, Seattle, WA, (publication data unverified) <http://www.novasim.com/downloads/How%20Low%20Can%20You%20Go.pdf>, accessed Jan. 10, 2005.

Lin et al., "*Extended-Enterprise Supply-Chain Management at IBM Personal Systems Group and Other Divisions*", Interfaces 30:1, pp. 7-25, at pp. 12-13 (Jan.-Feb. 2000) available at <http://www.interfaces.smeal.psu.edu/pdf/v30n1a2.pdf>.

Statement Regarding Public Use prepared by Applicants.

* cited by examiner

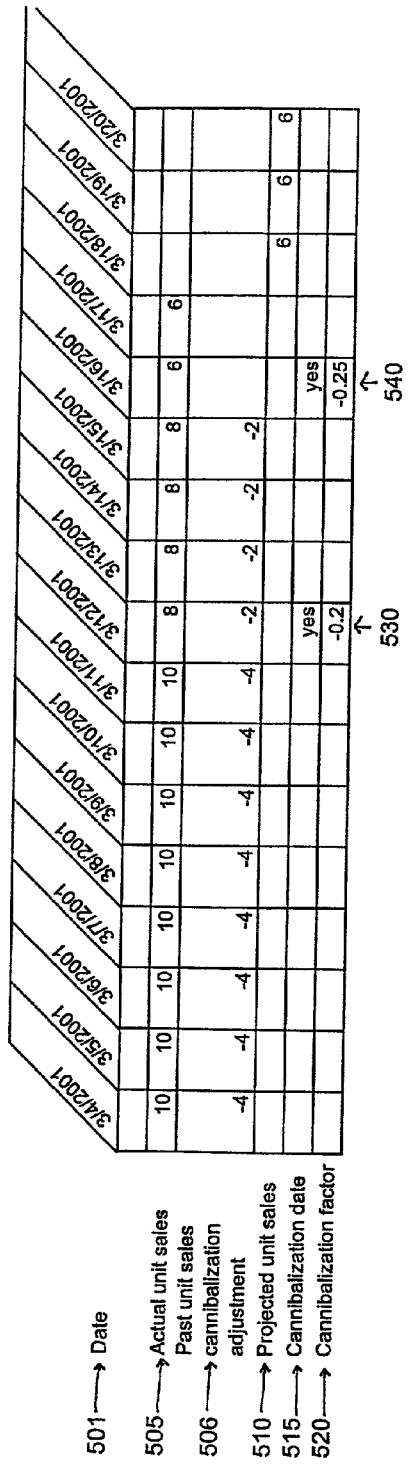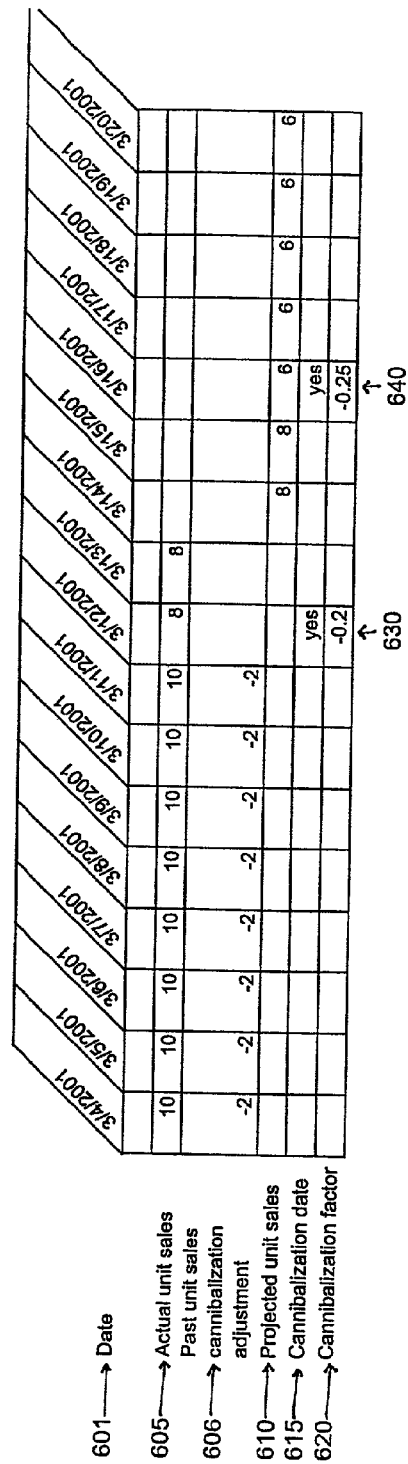

METHOD AND APPARATUS FOR HANDLING DISRUPTIVE EVENTS AND REPLACEMENT ITEMS

RELATED APPLICATION INFORMATION

This application is a continuation-in-part of the following related applications: application Ser. No. 09/888,336, filed 22 Jun. 2001, entitled A Method and Apparatus for OTB Analysis, by inventors Robert Dvorak, Richard W. Pasternack, Ronald Samuel Cope and Beth Li-Ju Chen; application Ser. No. 09/766,539, now pending, filed 19 Jan. 2001, entitled Multipurpose Presentation Demand Calendar For Integrated Management Decision Support, by inventor Robert Dvorak; application Ser. No. 09/760,377, now pending, filed 12 Jan. 2001, entitled Multipurpose Causal Event Calendar For Integrated Management Decision Support, by inventors Robert Dvorak and Kevin Katari; application Ser. No. 09/755,355, now pending, filed 5 Jan. 2001, entitled Method And Apparatus For Supplying Synthetic Sales Histories, by inventors Robert Dvorak and Kevin Katari; application Ser. No. 09/755,635, now pending, filed 5 Jan. 2001, entitled Method And Apparatus For Modification Of Basic Good Forecasts, by inventors Robert Dvorak and Kevin Katari; application Ser. No. 09/708,944, now U.S. Pat. No. 7,212,985, filed 8 Nov. 2000, entitled Method And Apparatus For Distribution Of Fashion And Seasonal Goods, by inventor Robert Dvorak. The six related applications are hereby incorporated by reference.

This application is further related to application Ser. No. 09/905,255, filed the same day as this application, entitled A method and Apparatus for Planning Analysis, by inventors Robert Dvorak, Richard W. Pasternack, Ronald Samuel Cope and Beth Li-Ju Chen, which simultaneously filed application is incorporated herein by reference.

BACKGROUND OF THE INVENTION

Two special issues in merchandise planning and management are disruptive events and replacement or substitution of items. Disruptive events change the pattern of sales for a good. Many disruptive events can be represented by a step function. That is, sales will step up or down at a relatively well-defined point in time and remain impacted. Disruptive events may impact needs for and sales of items either negatively or positively. For instance, introduction of a large package size of a good can negatively impact sales of small packages of the same good. The large package size cannibalizes sales of the small packages. Introduction of a complementary good, for instance, introducing jelly at a store that sells bread and peanut butter, could have a positive impact on sales of the related good. Competition, both from competitors' stores and sister stores, has similar step function impacts. Opening of a new store nearby can decrease sales. Closing of a nearby store can increase sales. Opening of complementary stores can increase neighborhood sales traffic and have a positive impact on sales. Disruptive events can impact items, locations or item/location pairs.

Replacement of items involves feathering together old and new items or treating them as if they were different items. The feathering of the old and the new item typically involves the old item remaining on the shelf side by side with the new item until the old item is sold out. In the feathering case introduction of a replacement item is not as simple as copying old item information to the new item and building upon it. A system maintains many types of old item-related information, some of which are not subject to bulk transfer in the feathering case.

It may also be desirable to jointly manage the phase out of the old item inventory while phasing in the new item inventory in a way that the stocking of the new item is affected by the remaining stock of the old item. A system also may need to segregate inventory and sales of the old and new items for one reason or another. At the same time, it may be desirable to treat the old and new items as one for most reporting purposes, taking care not to double count the old items for themselves and as items new items.

An opportunity arises for careful handling of disruptive events and replacement items, in order to enhance the effectiveness of merchandise planning and management systems, preferably with a modest input effort from operating personnel.

SUMMARY OF THE INVENTION

An aspect of the present invention includes a computer implemented method of handling disruptive events and replacement items in systems for merchandise planning or merchandise management. Other aspects of the present invention are reflected in the detailed description, figures and claims.

BRIEF DESCRIPTION OF THE DRAWINGS

FIG. 5 shows a simple example of day-to-day consistent past and future selling with two past negative events.

FIG. 6 shows a simple example of day-to-day consistent past and future selling with one past negative event and one future negative event.

DETAILED DESCRIPTION

Figure 1:
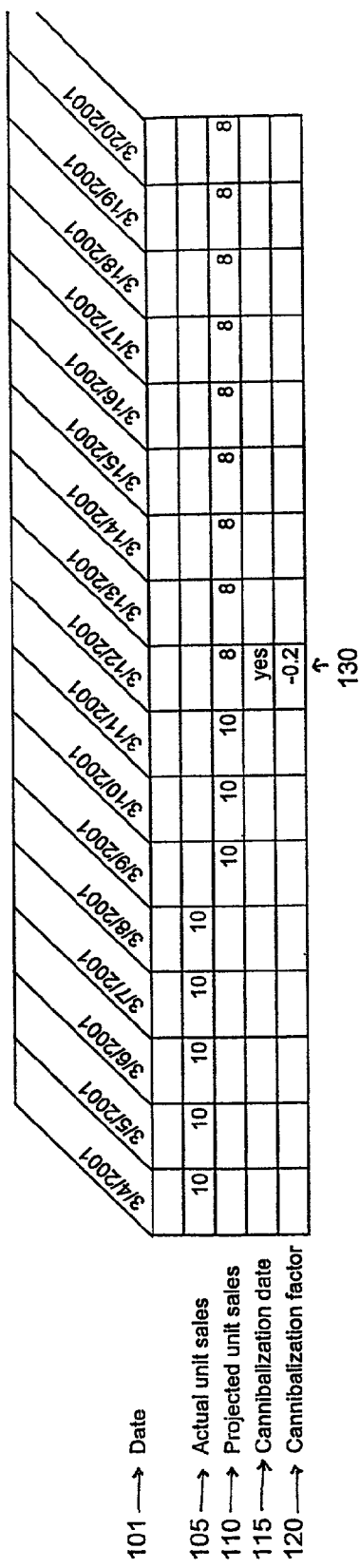
FIG. 1 shows a simple example of day-to-day consistent past and future selling with one future negative cannibalization event.

The following detailed description is made with reference to the figures. Preferred embodiments are described to illustrate the present invention, not to limit its scope, which is defined by the claims. Those of ordinary skill in the art will recognize a variety of equivalent variations on the description that follows.

The context for disruptive events and substitute products is any kind merchandise planning or management system, which includes forecasting of needs or sales. Application Ser. No. 09/755,355, filed 5 Jan. 2001, entitled Method And Apparatus For Supplying Synthetic Sales Histories, by inventors Robert Dvorak and Kevin Katari, incorporated herein by reference, describes forecasting using historical and artificial sales histories and SKU mapping. Further background is provided by application Ser. No. 09/760,377, filed 12 Jan. 2001, entitled Multipurpose Causal Event Calendar For Integrated Management Decision Support, by inventors Robert Dvorak and Kevin Katari, incorporated by reference, which describes use of a causal calendar to improve the handling of historical sales in forecasts and to adjust forecasts, both to take into account real world events that impact needs and sales. In the systems described, needs and sales may be tracked at an item/location level on a weekly basis or, preferably, on a daily or more frequent basis. Some of the other applications incorporated by reference describe forecasting at these levels and generation of decision support analyses and of orders, expedites and markdowns, as parts of an integrated system. The special issues addressed below improve planning and management of merchandise, if handled well.

Disruptive Events

The disruptive events described above are examples of identifiable factors that have a step impact on sales and needs. The present invention applies to these and any other identifiable factors that have a step and continuing impact on needs or sales, as opposed to short lived promotions, which are better addressed using the techniques described in application Ser. No. 09/708,944, filed 8 Nov. 2000, entitled Method And Apparatus For Distribution Of Fashion And Seasonal Goods, by inventor Robert Dvorak, utilizing the markdown manager component or in application Ser. No. 09/760,377, filed 12 Jan. 2001, entitled Multipurpose Causal Event Calendar For Integrated Management Decision Support, by inventors Robert Dvorak and Kevin Katari. A step impact differs from a promotion in the obvious ways and is handled differently. The system keeps the step impact distinct from the past or future sales to which it applies, for instance, in a separate field of the sales profile. In an alternative embodiment, the system could merge the handling of step functions with the handling of causal events, so that the step function was handled as an open-ended causal event, with a starting date and either a distant or open-ended end date for the causal event. A distant end date could correspond to a time when the planning cycle restarted, preferably after sufficient actual experience was accumulated to adjust the estimated step impact.

Retail and consumer merchandise planning and management systems today (other than systems implementing the present invention) do not have a sophisticated and user friendly way to build into future sales forecasts disruptive events causing cannibalization of demand or enhancing demand. Nor do they then allow a user to determine after the fact whether a pre-disruption impact estimate was accurate or to revise and improve the impact estimate based on actual sales. Adding these capabilities allows users to anticipate changes in sales caused by frequent occurrences, such as addition of new items that cannibalize demand for old items, or less frequent and more sweeping occurrences, such as the opening or closing of a competitive store. These features allow a user to identify when the sales impact will be felt, e.g., the date of the new product arrival or the date of the competitor store opening, and to estimate the sales impact at that time. With these estimates, longer lead time activities like ordering the item from manufacturing or a supplier can take into account the disruptive events. In an integrated system, the user can set and forget disruptive events having a step impact; the system automatically incorporates the step impact in all sales-related reporting and decisions. This sophistication and automation extends to checking actual sales impact at one or more predetermined times after the disruptive event happens, to test the actual magnitude of the sales impact and then automatically or manually to adjust future estimates of the step impact, consistent with actual sales. The adjusted future estimates carry over into forecasting of sales and stocking of goods, with less work for the user managing the item.

So-called "cannibalization cloning" starts with a user's estimate the impact of a disruptive event on item selling. The impact estimate can be subjective or have any other basis. The disruptive event may be an identifiable action by the retailer, such as introducing a new item or adding a nearby store that will cannibalize sales, or such as remodeling or resetting a store to make it more attractive, resulting in increased customer traffic and sales. The disruptive event could also be a competitive change, such as a competitor opening or closing a store nearby. Alternatively, the disruptive event could reflect an unanticipated or unpredicted impact on item selling, which is subsequently understood and linked to sales, either increased or decreased sales, with a date on which it started.

FIGS. 1-6 illustrate one embodiment of calculations implementing aspects of the present invention. The calculations depend on whether the impact date is in the future, the present (the same day that the analysis runs) or the past. When the impact is in the future, the sales history for the item and location remains unchanged and an impact estimate is included in the projection of the selling. FIG. 1 is an example in which past sales are extrapolated into the future with level daily sales. (In real world cases, sales may fluctuate with the day of the week. Sophisticated forecasting approaches such as segmented probabilistic, regression or different types of ARIMA, working with actual history and a causal calendar might not produce such level sales.) This example illustrates the basic logic and operation of an impact estimate or cannibalization factor, which is calendared for Mar. 12, 2001 with an impact estimate of −0.2. The cannibalization factor 120 is a fraction, multiplied by projected unit sales 110 and subject to a rounding rule. Any reasonable rounding rule can be used, or factional unit sales can be allowed. In an alternative embodiment, a specific sales quantity could be used for an impact estimate. For instance, if a competitor who was selling 100 items per day of an item closed their nearby store, 100 items per day could be used as the impact estimate and added to the projected need or sales. Using the multiplicative factor 120, FIG. 1 illustrates a drop in sales. The daily sales without the disruptive event on the date 130 are projected to be 10 units. The disruptive impact or cannibalization factor is expected to be −20% (e.g., the −0.2 at 120.) The new forecast, net of estimated disruptive impact, is 8 units (i.e., 10*(1−0.2) =8,) at 110 on day Mar. 12, 2001 and later.

Figure 2:
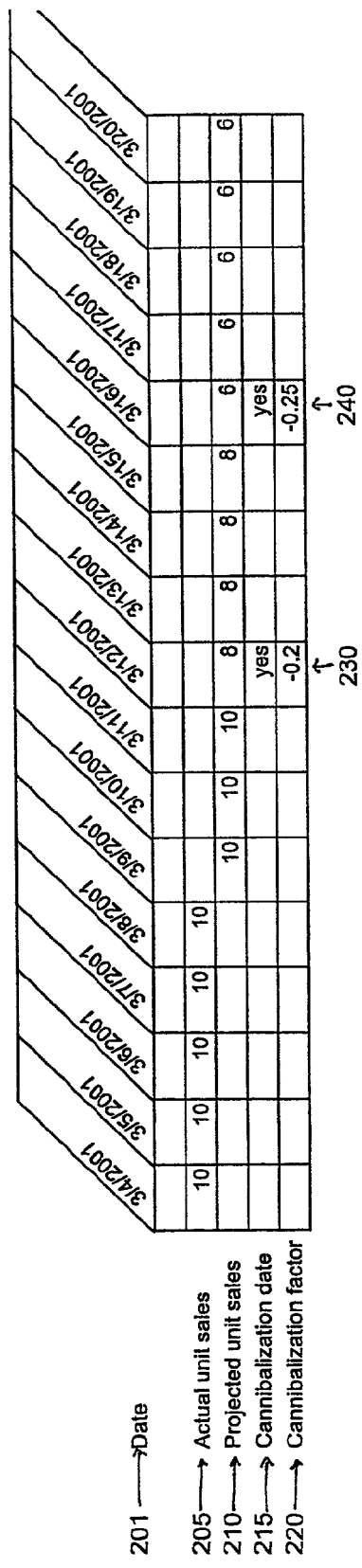
FIG. 2 shows a simple example of day-to-day consistent past and future selling with two future negative cannibalization events.
Figure 3:
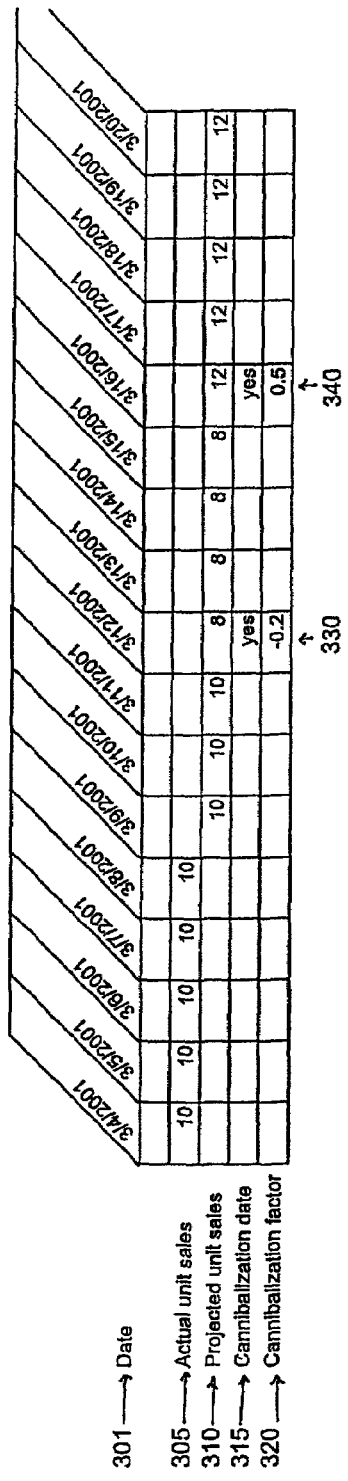
FIG. 3 shows a simple example of day-to-day consistent past and future selling with one negative and one positive future event.

FIG. 2 is an example in which a further cannibalization impact is expected at a second date. The cannibalization impact estimate is −25% 240. The original sales forecast is 10 units 310. The two cannibalization impacts are cumulative, resulting in a revised forecast of 6 unit sales (i.e., 10*(1−0.2) *(1−0.25)=6) 240. Complementary to FIG. 2, FIG. 3 illustrates a positive impact on sales at a second date, for example due to a competitive store closing. The cumulative impact in FIG. 3 is positive (i.e., 10*(1−0.2)*(1+0.5)=12) 340. An arbitrary number of cannibalization dates and factors can be applied in the same manner. They can be applied in any order, such as applying the most recent or most distant impact estimate first. If it is desired to apply multiple cannibalization factors to the same time period and keep the impacts distinct, additional fields can be added to accommodate the desired number of distinct impacts.

Figure 4:
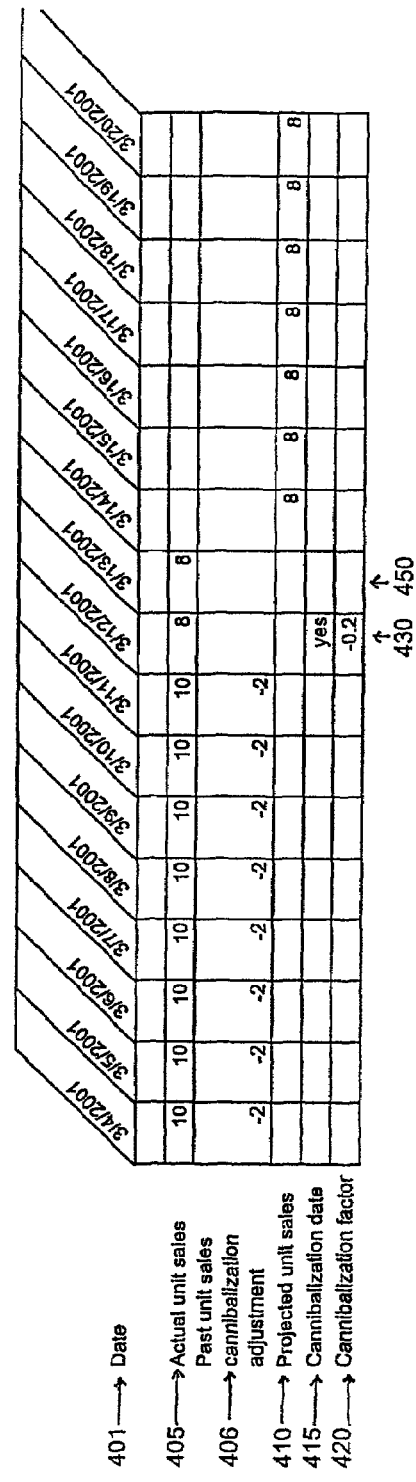
FIG. 4 shows a simple example of day-to-day consistent past and future selling with one past negative cannibalization event.

FIG. 4 illustrates the application of a cannibalization impact when the disruptive event happened in the past, on a date for which the actual sales are recorded. In FIG. 4, the cannibalization date 430 is a day before the last date with recorded sales 450. A deduction from actual sales is associated with the sales history for projection purposes, for the days before the date of the disruptive event. The cannibalization factor for a past disruptive event is not applied to the projected sales. Instead, the cannibalization factor 420 is used to create a so-called Past Unit Sales Cannibalization Adjustment 406. That Past Unit Sales Cannibalization Adjustment 406 is the cannibalization factor 420 times the actual unit sales 405 net of any previous Past Unit Sales Cannibalization Adjustment 406 values. In FIG. 4, there is only one disruptive event, so the Past Unit Sales Cannibalization Adjustment 406 is simply the cannibalization factor 430 times the actual unit sales 405 (e.g., −0.2*10=−2). And once a sale is recorded for a date with a cannibalization factor 430, then all the dates with sales before that date have a Past Unit Sales Cannibalization Adjustment 406 calculated. The revised sales history and the associated impacts are then used to project future needs and sales.

FIG. 5 illustrates a more complicated case, in which there are two disruptive events in the past. The Past Unit Sales Cannibalization Adjustment will factor in both previous adjustments. In FIG. 5, the "−4" values 506 from Mar. 4, 2001 to Mar. 11, 2001 are actually composed of 2 different cannibalization impacts. For a disruptive event commencing on Mar. 12, 2001, the first non-zero value of Past Unit Sales Cannibalization Adjustment 406 is calculated. Because the relevant sales are 10 and the factor is −0.2, a value of "−2" is applied to all the dates before Mar. 12, 2001. Then, due to a second disruptive event commencing on Mar. 16, 2001, the cumulative Past Unit Sales Cannibalization Adjustment 506 all the dates before Mar. 12, 2001 is calculated by adding the existing value of Past Unit Sales Cannibalization Adjustment 506 (i.e., −2) to the Actual Unit Sales 505 plus the current value of the Past Unit Sales Cannibalization Adjustment 506 (i.e., −2) times the cannibalization factor 540 (i.e., −0.25) so that the overall calculation is −2+(10−2)*0.25=−4. If there were then subsequent cannibalization dates that become in the past then each would successively be added into creating the Past Unit Sales Cannibalization Adjustment 506.

One issue to be considered in application of the present invention in the case when the disruptive event happens today, when the analysis is being carried out. Should today's disruptive event be treated as a past or future event? The mode above assumes the cannibalization starts at opening time on the cannibalization date, however, closing time on the cannibalization date or half way through that day could be used. The time increments also could be different than days: longer, such as weeks or shorter, such as hours.

The system also can handle mixed situations, in which disruptive events happen in both the past and future. In FIG. 6, Past Unit Sales Cannibalization Adjustment values 606 are calculated for cannibalization events with cannibalization dates 630 in the past (i.e., where actual unit sales 605 have been recorded). For cannibalization events that are in the future the cannibalization factor 640 is applied in calculating the Projected unit sales 610 for the cannibalization date 640 and any dates further out into the future. In other settings there may be multiple of cannibalization dates 615 that are now in the past and in the future and where those would be handled as described above.

A system practicing aspects of the present invention changes its handling of disruptive events, as time passes and an event changes from being a future event to being a past event. Associating a cannibalization factor with a specific date or date and time is one way to facilitate this automatic adjustment in the handling of disruptive events. Automatic adjustment allows the user to set a factor and then forget about it. The system correctly handles the event as it moves from the future into the past.

Another aspect of the present invention is that the system also can automatically rescale the estimated impact of one or more disruptive events after real sales results are posted. This is done using the logic described in application Ser. No. 09/755,355, filed 5 Jan. 2001, entitled Method And Apparatus For Supplying Synthetic Sales Histories, by inventors Robert Dvorak and Kevin Katari, which is incorporated by reference. After a predetermined time interval, posted actual sales are compared to the a priori impact estimate and the impact estimate is corrected. The corrected impact estimate is used to recalculate the Past Unit Sales Cannibalization Adjustment values. This further simplifies the user workload and automatically increases the accuracy of the projected unit sales, as a corrected impact estimate or cannibalization factor is used in calculations.

Substitute Products

Replacement mapping of a new item to an old item is useful where some form of item replacement is done, such as a packaging change, label change, sometimes slight sizing change or any other change where a new item will replace the old item. In application Ser. No. 09/755,355, filed 5 Jan. 2001, entitled Method And Apparatus For Supplying Synthetic Sales Histories, by inventors Robert Dvorak and Kevin Katari, a portion of the steps implementing replacement mapping are described, in particular, mapping a new SKU for a good to an old SKU for a good can optionally be accompanied by flagging old and new inventory as basically interchangeable. That is, new inventory can be flagged as being available to meet demand for the cloned good, and vice-a-versa. A "map on hand" option can directs the system to count location, distribution center and other inventory (e.g., on hands and in transits) for a discontinued good against the required model stock or forecast demand for the new, repackaged item. Also treated at length therein is the automatic scaling of forecasts based on actual sales. That is, a priori forecasts can, after a predetermined or user selected time period of actual sales, be adjusted or scaled based on the actual sales. This adjustment can be either automatic or with user interaction. There are additional aspects to the present invention.

For items flagged to treat old and new items as basically interchangeable, the system combines the items for most purposes but displays them separately as required or requested, without double counting. For merchandise planning and management purposes, the items are linked. Need and sales estimates are based on the combined availability of both items. Demand for new items is satisfied with old items and overstocking with new items is avoided. One impact of treating the items interchangeably is adaptability to a date of transition from the old to new item which is unpredictable or changing, due to actual sales of the old item. Linking the old and new items for planning and management purposes relieves the user of tinkering with protected sales of the new item, tracking the actual transition date. The system optionally reports both the linked old and new items. Aggregate reports of linked items avoid double counting of either the old or new items, when displaying the linked items separately. An old item linked to a new item is counted only once as inventory on hand for open-to-buy purposes, for instance, instead of being counted both as the old item and as the new item to which it is linked.

The system can automatically set an out date for the old item and an in date for the new, replacement item. The operation of in and out dates is described in many of the incorporated applications. Application Ser. No. 09/755,635, filed 5 Jan. 2001, entitled Method And Apparatus For Modification Of Basic Good Forecasts, by inventors Robert Dvorak and Kevin Katari contains an extensive discussion of the impact of in dates and out dates on a coverage cycle in a distribution network, which applies to the impact of automatically setting in and out dates. In an alternative embodiment, the system can suggest in and out dates for user confirmation, either interactively at a display screen or in a report. More than one set of in and out dates can be suggested, if preferred. It is anticipated that users will prefer automatic setting of in and out dates, to reduce the number of steps required to replace an old item with a new item.

The system can automatically rescale the new item after actual sales are posted. As described above, a priori forecasts can, after a predetermined or user selected time period of actual sales, adjusted or scaled to reflect the actual sales. This adjustment can be either automatic or with user interaction. Combining this automatic feature with the automatic setting of in and out dates provides a simple way for a user to replace an old item with a new one.

Another automatic or semi-automatic feature of item replacement is translating presentation quantities ("PQs") and causal calendar events for a plurality of locations from the old to the new item. Either or both of these data collections can be translated with little or no user time demands. It is useful to automatically transfer PQs and causal calendar events because the transition date on which sales of the new item will begin may be a moving target, depending on actual sales of the residual old item inventory. PQs are set on an item/location (or location type) basis and may be set on a weekly, daily or more frequent basis. Different embodiments of the PQ translation feature can apply different translation rules or combinations of rules and can involve differing degrees of user interaction. One rule for translating PQs is to assign values from the old item to the new item, regardless of whether or not PQs have been assigned to the new item. A variation on this rule is to allow protection of specific new item PQs, so that old item PQs will be assigned to the new item, regardless of whether or not PQs have been assigned, unless PQs assigned to the new item have been flagged as protected. Another rule for translating PQs is to assign the maximum of the PQs set for the new and old items, with a null or missing value being filled in by assignment. A third rule is to use new item PQs for the first date for which they are posted and all dates thereafter, and to use old item PQs for all dates preceding that first posted date. The program could show the user the alternative effects of two, three or more rules, without applying them. The user could pre-select one translation rule or the other or set rules for adopting one translation rule or another, so the translation would run automatically, without user intervention. Alternatively, the system could prompt the user to select a translation rule in some or all instances, at the item level or a higher level in the inventory hierarchy such as class or department or by location. The system could prompt the user to select a translation rule with or without providing data illustrating the impact of alternative selections.

Automatic translation of causal calendar events as part of automatic or semi-automatic item replacement is a time-saver for users. Promotions can be scheduled seasonally or around special selling days and be applied even if a supplier begins shipping a replacement product. Causal calendar impacts of all types can be set up and left in place for a replacement product. This may be particularly helpful for products that the supplier controls, which are subject to new packaging or feature modifications with little or no notice to the retailer. Causal calendar events like PQ's are set on an item/location (or location type) basis and may be set on a weekly, daily or more frequent basis. Different embodiments of the Causal translation feature can apply different translation rules or combinations of rules and can involve differing degrees of user interaction. One rule for translating Causal calendars is to assign values from the old item to the new item, regardless of whether or not Causal calendars have been assigned to the new item. A variation on this rule is to allow protection of specific new item Causal calendars, so that old item Causal calendars will be assigned to the new item, regardless of whether or not Causal calendars have been assigned, unless Causal calendars assigned to the new item have been marked protected. Another rule for translating Causal calendars is to assign both the Causal calendars set for the new and old items. A third rule is to use new item Causal calendar events for the first date for which they are posted and all dates thereafter and to use old item Causal calendars for all dates preceding the first date for which a new item Causal calendar event is posted. The program could show the user the alternative effects of two, three or more rules, without applying them. The user could pre-select one translation rule or the other or set rules for adopting one translation rule or another, so the translation would run automatically, without user intervention. Alternatively, the system could prompt the user to select a translation rule in some or all instances, at the item level or a higher level in the inventory hierarchy such as class or department or by location. The system could prompt the user to select a translation rule with or without providing data illustrating the impact of alternative selections.

While the preceding examples are cast in terms of a method, devices and systems employing this method are easily understood. A magnetic memory containing a program capable of practicing the claimed method is one such device. A computer system having memory loaded with a program practicing the claimed method is another such device.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:

1. A computer-implemented method of responding to a disruptive event that impacts demand into the indefinite future for a plurality of items at one or more locations, including:

modeling with a data structure stored in computer readable memory one or more disruptive events that impact demand for a plurality of items at one or more selling locations, wherein the disruptive events, unlike transitory promotional events, have an impact on the demand into the indefinite future for the plurality of items that are represented in the data structure by a data tuple including at least a good identifier for a good, a selling location identifier for a selling location, a start date and no effective stop date, and at least a step function that represents an impact estimate of disruption to demand for the good at the selling location beginning at the start date;

for the disruptive events, eliciting from a retail manager data to describe the disruptive events and populate the data tuple, including an estimate of the step functions representing the disruptive events;

forecasting, using a computer, unit inventory and unit sales at a per-item, per-location level for a predetermined period using a computer using the step functions to take into account the disruptive events; and generating, from results of the forecasting using the data structure consistently across analytical tools, analytical reports that support retailing activities.

2. The method of claim 1, wherein the method accommodates impact estimates that can be both positive and negative.

3. The method of claim 1, wherein the impact estimates are factors multiplied by sales history quantities, for past disruptive events, and by the projected demand, for future disruptive events.

4. The method of claim 1, wherein the impact estimates are quantities added to sales history quantities, for past disruptive events, and to the projected demand, for future disruptive events.

5. The method of claim 1, wherein the disruptive events include a plurality of disruptive events that apply to a particular item at a particular location.

6. The method of claim 5, wherein a plurality of impact estimates for the plurality of disruptive events are combined multiplicatively.

7. The method of claim 5, wherein a plurality of impact estimates for the plurality of disruptive events are combined additively.

8. The method of claim 5, wherein a plurality of impact estimates for the plurality of disruptive events are combined by a combination of addition and multiplication.

9. The method of claim 5, wherein a plurality of impact estimates for the plurality of disruptive events are applied beginning with a most recent disruptive event.

10. The method of claim 5, wherein a plurality of impact estimates for the plurality of disruptive events are applied beginning with a most distant disruptive event.

11. The method of claim 1, further including applying a plurality of forecasting techniques to the sales history quantities to derive a plurality of projected demand estimates.

12. The method of claim 1, further including applying a probabilistic forecast technique to the sales history quantities to derive the projected demand.

13. The method of claim 1, further including applying a segmented probabilistic forecast technique to the sales history quantities to derive the projected demand.

14. The method of claim 1, further including applying a regression forecast technique to the sales history quantities to derive the projected demand.

15. The method of claim 1, further including applying an ARIMA forecast technique to the sales history quantities to derive the projected demand.

16. The method of claim 1, further including evaluating an actual impact of least one particular disruptive event that has already taken place at least a predetermined period prior to adjustment of the projected demand, and adjusting the impact estimates based on the evaluated actual impact of the disruptive event.

17. The method of claim 16, wherein the predetermined period is user selected.

18. The method of claim 16, wherein the predetermined period is measured in days.

19. The method of claim 16, wherein the predetermined period is measured in time increments of less than a day.

20. The method of claim 1, wherein the disruptive events represent cannibalization of sales or demand for a first item across multiple locations by introduction of a second item at the locations.

21. The method of claim 1, wherein the disruptive events represent opening or closing of a competing store that impacts sales or demand at the one or more selling locations.

22. The method of claim 1, wherein the disruptive events are future events when the forecasting is carried out and the disruptive events are taken into account to adjust the projected demand.

23. A computerized system for adjusting projected demand for a plurality of items at a plurality of locations on an item-location basis, the system including:
   a processor;
   memory coupled to the processor;
   logic and resources operatively coupled to the memory and processor, the logic and resources adapted to maintain a calendar of future disruptive events that will impact demand for a particular item at a particular location, including data tuples for the disruptive events that include at least a good identifier, a selling location identifier, a start date and no effective stop date, and at least a step function increase or decrease in projected demand as a consequence of the disruptive event;
   the logic and resources further adapted to elicit from a retail manager data to describe the disruptive events and populate the data tuple, including an estimate of the step functions representing the disruptive events;
   the logic and resources utilizing the calendar of disruptive events to apply the step functions to adjust the projected demand for the plurality of items at the plurality of locations for a predetermined time in the future and to report the adjusted projected demand.

24. The system of claim 23, wherein the disruptive events represent cannibalization of sales or demand for a first item at a particular location by introduction of a second item at the particular location.

25. The system of claim 23, wherein the disruptive events represent opening or closing of a competing store that impacts sales or demand at the location.

* * * * *